No. 876,718. PATENTED JAN. 14, 1908.
O. KAMPFE.
IMPLEMENT HANDLE.
APPLICATION FILED JULY 19, 1907.
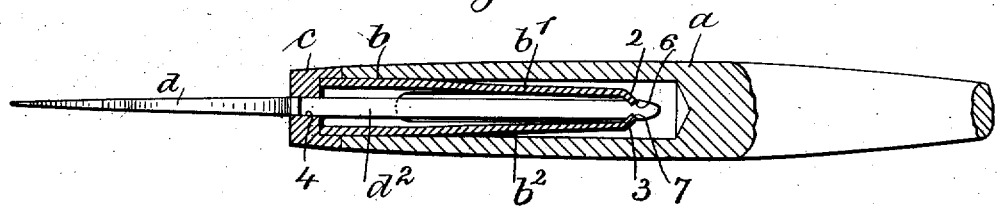
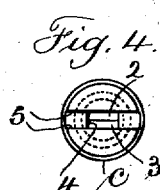
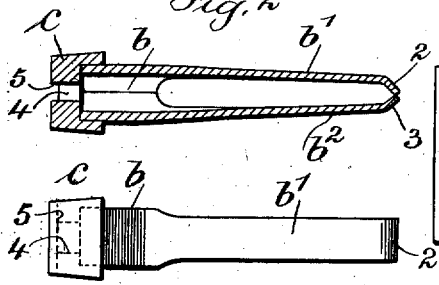
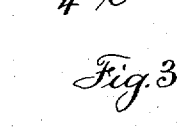
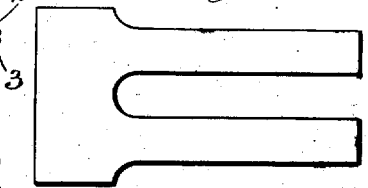
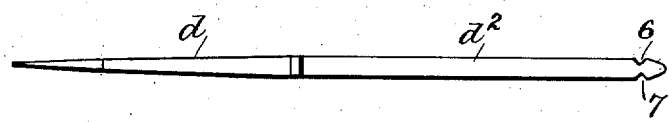
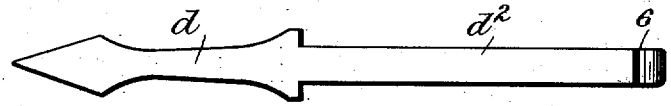
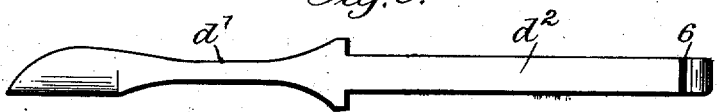
Witnesses
Chas H Smith
Inventor
Otto Kampfe.
per Harold Serrell
his Atty

UNITED STATES PATENT OFFICE.

OTTO KAMPFE, OF NEW YORK, N. Y.

IMPLEMENT-HANDLE.

No. 876,718.　　　Specification of Letters Patent.　　　Patented Jan. 14, 1908.

Application filed July 19, 1907. Serial No. 384,506.

*To all whom it may concern:*

Be it known that I OTTO KAMPFE, a citizen of the United States, residing at the borough of Brooklyn, in the county of Kings, city and State of New York, have invented an Improvement in Implement-Handles, of which the following is a specification.

My invention relates to a new and novel form of handle adapted to receive and securely hold the shanks of a set of interchangeable tools or implements such as are employed in a manicure or other useful set.

In the device of my improvement the handle includes a body portion substantially cylindrical in cross section and hollow at one end, an internal member of metal in part tubular and with inwardly extending spring gripping-arms and an end ferrule, through which and said tubular member the shank of each interchangeable tool passes to gripping contact and connection between the free ends of the arms of said members; there being oppositely disposed notches in the end of the shank to receive the free ends of said arms.

The manner of forming and connecting the said parts is hereinafter more particularly described.

In the drawing, Figure 1 is a longitudinal section and partial elevation representing the devices of my improvement. Fig. 2 is a longitudinal section and Fig. 3 a plan representing the tubular member and the arms forming part thereof, and the end ferrule, Fig. 4, is an end view showing the slotted aperture of the ferrule. Fig. 5 is a plan view of the sheet metal blank from which the tubular member is formed. Fig. 6 is an edge view and Fig. 7 a plan of one of the tools or implements adapted to be connected to this handle, and Fig. 8 is a plan view similar to Fig. 7, showing a different form of implement.

The handle $a$ at its longest end is substantially circular and tubular or hollow at the free end. It preferably tapers off to the other free end at the place adapted to be held in the hand. It is preferably formed of hard rubber or celluloid. The tubular member $b$ formed with oppositely disposed flat converging arms $b^1$ $b^2$ is of metal preferably stamped out from a single piece and rolled up with the part $b$ cylindrical (see Fig. 5). The free ends of the arms $b^1$ $b^2$ are in-turned at 2 3 so that in an initial position without the inserted tang of the tool, these in-turned ends substantially come together.

If the tubular member $b$ is rolled up the same will show a line of juxtaposed ends as in Fig. 2. I prefer to roll this piece up from a blank as it is less expensive to make. The same however may be cut from a tube in any manner well known in the art.

$c$ represents a ferrule to receive the free end of the tubular member $b$ and to come against the end of the tubular portion of the handle. This ferrule is centrally perforated and transversely slotted (see Figs. 2–4) and recessed on one side so as to connect the same to the said tubular member. I prefer to roughen the outer surface of this tubular member $b$ in any desired manner and to apply a pressure to the same while forcing it into the recess of the ferrule. These parts can in this manner be forced together and frictionally held so that there is no liability of their separation. The tubular member with its arms $b^1$ $b^2$ is to be forced into the cavity of the tubular portion of the handle. This I prefer to accomplish by heating the end of the hard rubber or celluloid handle,— preferably in hot water which expands the same sufficiently to enable one to force the tubular member into the end of the handle and into position up against the end surface of the ferrule.

The contraction upon the surface of the tubular member causes the free larger end of the handle to grip the tubular member very securely when the handle cools and especially so when the surface of the tubular member is roughened to assist this grip.

$d$ $d^1$ represent examples of tools adapted for use in a manicure set,—the same being provided with shanks $d^2$ and shoulders at the point of intersection of the tools and the shanks. The free ends of the shanks are provided with oppositely disposed notches 6 7 arranged at a predetermined distance from the shoulders, for when the shanks are inserted in the handle they pass through the central perforation 4 of the ferrule and the shoulders pass into the transverse slot 5 of the ferrule, and I prefer to make the shouldered portion of the tools of a thickness that agrees exactly with the width of the slot and the width of the central perforation and of a length agreeing with the diameter of the ferrule so that a snug fit is assured when the tools are introduced in the handle, providing against lost motion.

Fig. 1 illustrates how the shank of the tool is received and held by the in-turned ends 2 3 of the arms $b^1$ $b^2$; the same springing apart with the insertion of the shank and closing down into the notches. The surfaces of these notches are at substantially a right angle, as are the faces of the in-turned ends 2 3, so that it is just as easy to disconnect the shank of the tools therefrom by pulling outwardly on the tool as it is to connect the shank by pushing the shank into the handle and into position, and when the handle is thus connected to the ends of the arms, it is secured in position for all the uses of like work to which tools of this class are put, and it is apparent that one handle will answer for any number of interchangeable tools that may be necessary in a set.

I claim as my invention:

1. In an implement handle and in combination, a handle of suitable material tubular at one end, a tubular member, oppositely disposed arms connected therewith and the free ends of which are in-turned toward one another, the open end of the handle being adapted to receive this tubular member, and a ferrule connected to the free end of the tubular member and coming against the end of the handle and centrally perforated to receive the tang of a tool.

2. In an implement handle and in combination, a handle of suitable material, tubular at one end, a tubular member, oppositely disposed arms connected therewith and the free ends of which are in-turned toward one another, the open end of the handle being adapted to receive this tubular member, and a ferrule connected to the free end of the tubular member and coming against the end of the handle and centrally perforated to receive the tang of a tool and the surface of the tubular member roughened for connection under tension with the ferrule and under compression in the handle.

3. The combination with the handle $a$ hollow or tubular at one end, of a tubular member of metal $b$, oppositely disposed spring arms $b^1$ $b^2$ formed integral with said tubular member and having in-turned ends 2 3, a ferrule $c$ centrally perforated at 4 and transversely slotted at 5 to receive the tang and shoulder of an interchangeable tool and provided with a recess on the side opposite to the transverse slot to receive the free end of the tubular member when forced into connection therewith, the tang of the tool having oppositely disposed end notches to receive the in-turned ends of the aforesaid arms.

4. The combination with the handle $a$ hollow or tubular at one end and formed of hard rubber or celluloid adapted to expand with heat and contract with cold upon a subsequently inserted member, of a tubular member adapted to be forced into the hollow end of the handle and held by the contraction of the same upon cooling, oppositely disposed spring-arms $b^1$ $b^2$ formed integral with said tubular member and having in-turned ends 2 3, a ferrule $c$ centrally perforated at 4 and transversely slotted at 5 to receive the tang and shoulder of an interchangeable tool and provided with a recess on the side opposite to the transverse slot to receive the free end of the tubular member when forced into connection therewith, the tang of the tool having oppositely disposed end notches to receive the in-turned ends of the aforesaid arms.

5. In combination with a handle of suitable material tubular at one end, a tubular member adapted to be held therein and having oppositely disposed inwardly extending spring arms, a ferrule, recessed for connection with one end of said tubular member and perforated and slotted to receive the shank and shoulder of an interchangeable tool and to come against the free end of the handle and means at the ends of the spring arms and end of the shank of the tool, whereby the tool is engaged and held within the handle.

6. In combination with a handle of suitable material tubular at one end and adapted to be expanded by the application of heat, a tubular member having a roughened exterior adapted to be held in the handle by contraction of the material thereof around the tubular member, said tubular member having oppositely disposed inwardly extending spring-arms, a ferrule recessed upon one side to receive and be connected with one end of said tubular member and said ferrule centrally perforated and transversely slotted to receive the shank and shoulder of an interchangeable tool and to come against the free end of the handle and means at the ends of the spring-arms and end of the shank of the tool, whereby the tool is engaged and held within the handle.

7. In combination with a handle of suitable material tubular at one end and adapted to be expanded by the application of heat, a tubular member having a roughened exterior adapted to be held in the handle by contraction of the material thereof around the tubular member, said tubular member having oppositely disposed inwardly extending spring-arms, a ferrule recessed upon one side to receive and be connected with one end of said tubular member and said ferrule centrally perforated and transversely slotted to receive the shank and shoulder of an interchangeable tool and to come against the free end of the handle, the said spring-arms having inturned engaging free ends and the free end of the shank of the interchangeable tool having oppositely disposed recesses to receive the aforesaid ends of the spring-arms within the handle in connecting the interchangeable tool to the handle.

Signed by me this 12th day of July 1907.

OTTO KAMPFE.

Witnesses:
GEO. T. PINCKNEY,
E. ZACHARIASEN.